United States Patent [19]

Komata

[11] Patent Number: 4,889,518
[45] Date of Patent: Dec. 26, 1989

[54] POWER TRANSMISSION DEVICE

[76] Inventor: Shinji Komata, 2-1912-2, Ogawa-machi, Kodaira-shi, Tokyo 187, Japan

[21] Appl. No.: 137,361

[22] Filed: Dec. 23, 1987

[30] Foreign Application Priority Data

Feb. 9, 1987 [JP] Japan .................................. 62-27922

[51] Int. Cl.$^4$ .............................................. F16D 3/50
[52] U.S. Cl. ..................................... 464/102; 464/147
[58] Field of Search ................. 464/88, 102, 147, 149, 464/157, 158

[56] References Cited

U.S. PATENT DOCUMENTS

| 1,171,347 | 2/1916 | Morse | 464/102 X |
| 2,442,838 | 6/1948 | Butterfield | 464/149 X |
| 3,429,143 | 2/1969 | Sabre | 464/149 |
| 3,541,868 | 11/1970 | Hall | 464/147 X |

FOREIGN PATENT DOCUMENTS 1077461 7/1967 United Kingdom .
1256870 12/1971 United Kingdom .

Primary Examiner—Daniel P. Stodola
Attorney, Agent, or Firm—Browdy and Neimark

[57] ABSTRACT

A power transmission device including a power input member supported by a frame and the like, a rotating shaft to which power is finally transmitted, and a cylindrical power relay member arranged between the power input member and the rotating shaft with a certain clearance interposed between them, wherein said power relay member is engaged with the power input member at one end thereof while with the rotating shaft at the other end thereof.

11 Claims, 5 Drawing Sheets

FIG. 1A
PRIOR ART
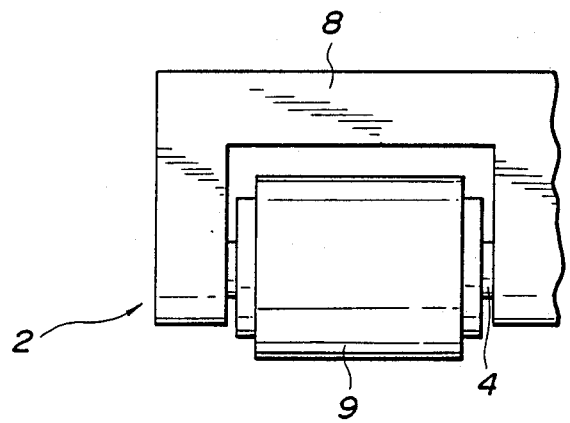
PRIOR ART
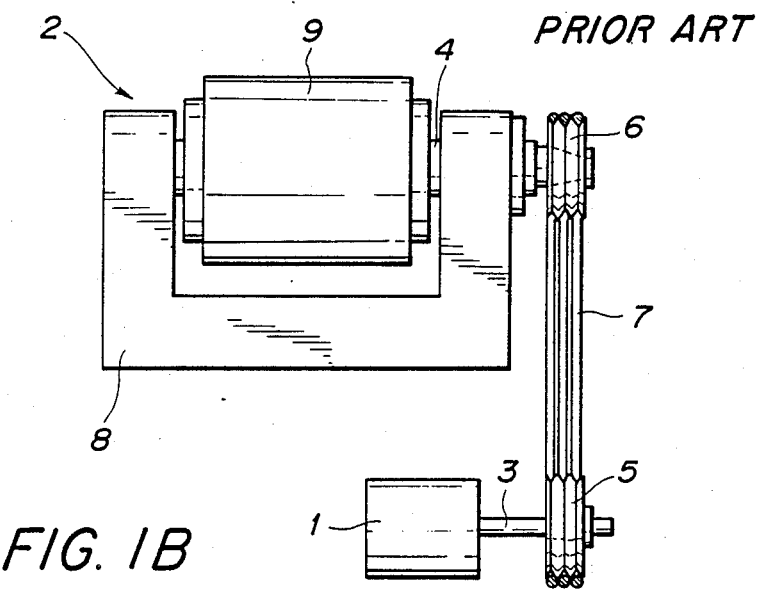
FIG. 1B

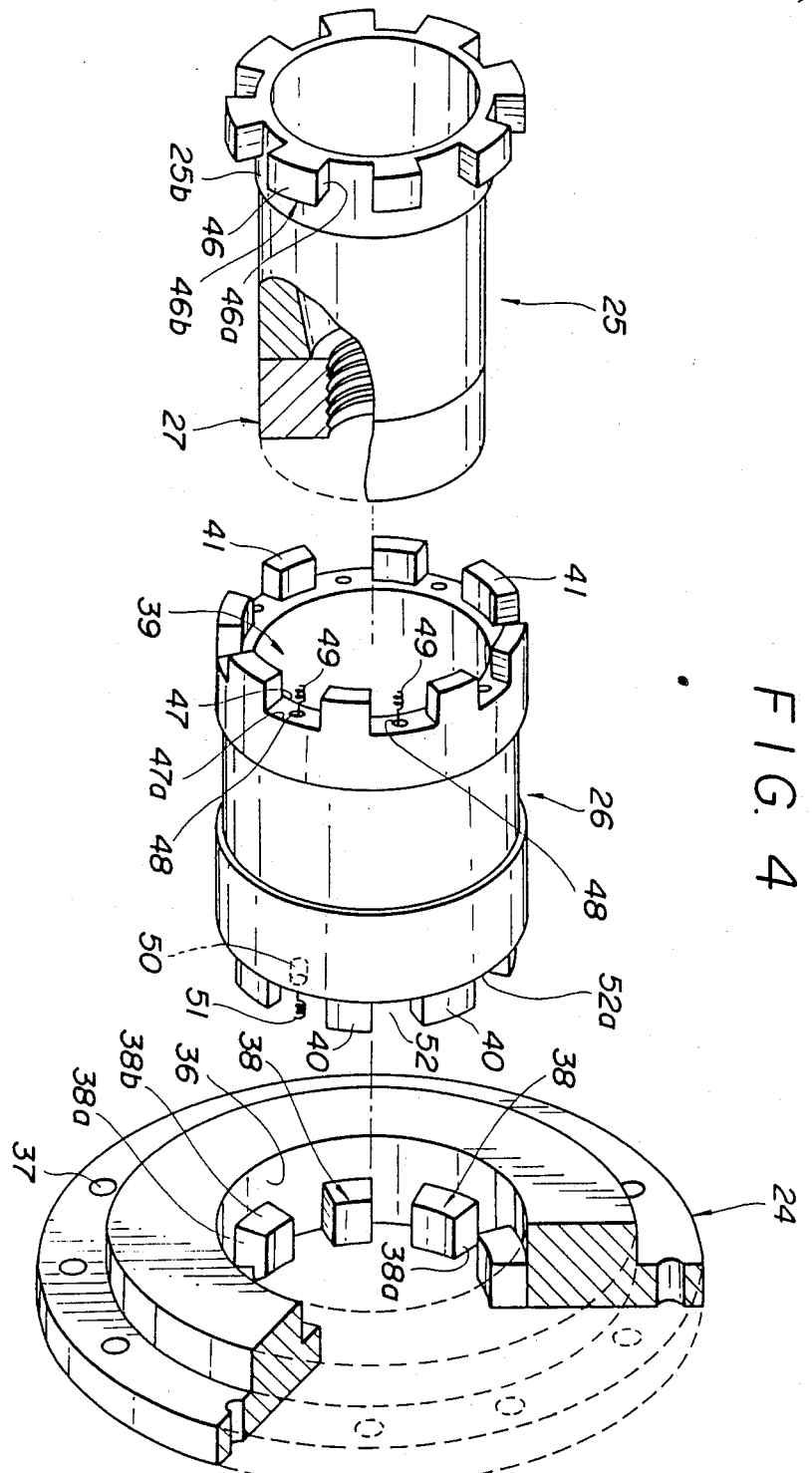

POWER TRANSMISSION DEVICE

BACKGROUND OF THE INVENTION

1. Field of the Invention:

The present invention relates to a power transmission device and more particularly, it relates to a power transmission device capable of transmitting drive force through the belt, chain or the like, absorbing the eccentric movement and the like of the pulley.

2. Prior Art:

In the case of the grinder and machine tools for centerless machining, and machines for conveying goods, for example, power transmission to rotate rollers is usually achieved by the belt drive system. FIGS. 1a and 1b show an example of this power transmission, citing the jackshaft portion of the centerless grinder. The power transmission from a drive motor 1 to a jackshaft 2 is carried out by pulleys 5 and 6 attached to an output shaft 3 of the drive motor 1 and a roller shaft 4 of the jackshaft 2, respectively, and belt members such as V-belts 7 stretched between the pulleys 5 and 6. The jackshaft 2 includes a U-shaped frame 8, a roller 9 rotatably supported by the frame 8 through a roller shaft 4, and a case filled with oil to smoothly rotate the roller shaft 4 supported by the frame 8.

FIG. 2 shows in detail how the pulley 6 is attached to the roller shaft 4 in the case of the conventional jackshaft 2. The roller shaft 4 is tapered, that is, it is made larger and larger in diameter as it goes to its base, and it is provided with a thread portion 4b at the foremost end of its tapered portion 4a. It is also provided with a shoulder portion 4c, larger in diameter, at the base of its tapered portion 4a and it further extends toward the roller 9 (or left in FIG. 2). The pulley 6 has a tapered opening fitting to the tapered portion 4a of the roller shaft 4 and it is also provided with a recess 14 at its foremost end which houses a fastening member for attaching it to the roller shaft 4. Key grooves 12 each extending in the longitudinal direction are provided on the outer circumference of the tapered portion 4a of the roller shaft 4 and also on the inner circumference of the tapered opening of the pulley 6. The pulley 6 is fitted onto the roller shaft 4, a key 13 is put into the key grooves 12 and a nut 11 which serves as the fastening member is screwed onto the thread portion 4b of the roller shaft 4. The pulley 6 is thus fastened and fixed integral to the roller shaft 4 in such a way that its base end face is not struck against the shoulder portion 4c of the roller shaft 4 but positioned adjacent to it. When the V-belts 7 are stretched between the pulley 6 thus fixed and the pulley 5 positioned on the side of the drive motor, the power transmission system to the jackshaft 2 is completed accordingly.

In the case of this conventional power transmission system, however, attaching of the pulley 6 to the driven roller shaft 4 is achieved by closely fitting the tapered opening 6a of the pulley 6 onto the tapered portion 4a of the roller shaft 4. Therefore, some influence which is caused by or given to the pulley 6 at the time of power transmission is added to the roller shaft 4 to badly affect the movement of the jackshaft 2. The roller shaft 4 and the pulley 6 are rotating members in the jackshaft 2. It is therefore the best that their rotating center axes are consistent with each other as shown by 0 in FIG. 2. In practice, however, their rotating center axes are shifted from each other because of working error, impact added to them after the completion of the device, and the like, thereby causing eccentricity as shown by a two-dot and dash line 01 in FIG. 2. Even when their rotating center axes are consistent with each other, that face of the pulley 6 with which the belt is contacted may not be made as a true circle. The possibility is caused in this case that unreasonable force is added to the pulley 6 to force the roller shaft 4 to one side. The device is thus gradually made loose.

When the conventional couplings are used as a transmission manner, it is almost impossible that the driving and driven couplings are on a same line. Even if the clearance is made larger between them, the possibility is high that the roller shaft is forced to one side. Further, when minus torque acts, the V-belts 7 are irregularly rotated because the clearance is large.

SUMMARY OF THE INVENTION

The present invention is therefore intended to eliminate the above-mentioned drawbacks and the object of the present invention is to provide a power transmission device capable of stably transmitting power to a driven rotating body even when the driven rotating body is made a little eccentric.

The object of the present invention can be achieved by a power transmission device comprising a power input member such as the pulley rotatably supported by a frame, a rotating shaft to which power is finally transmitted, and a cylindrical power relay member arranged between the power input member and the rotating shaft with a certain clearance interposed, wherein said power relay member is engaged with the power input member at one end thereof and with the rotating shaft at the other end thereof.

The power input member is rotatably supported by the frame. Even when force except rotating force is applied to the power input member, therefore, the power input member is supported by the frame. And the force (or rotating force) applied to the power input member is transmitted to one end of the power relay member to rotate it similarly to the power input member. The rotation of this power relay member is transmitted to the rotating shaft, which is engaged with the other end of the power relay member, to rotate the driven rotating body. The power relay member is engaged with the rotating shaft at the other end thereof but left not-contacted with it at the remaining area thereof. Therefore, the power relay member transmits power from the power input member to the rotating shaft under the condition that it is fixed at its one end and that it is subjecting to torsion. Even when radial shift caused by the eccentricity and the like is to be transmitted from the rotating shaft to the power input member or from the power input member to the rotating shaft, therefore, the shift is absorbed by the deflection of the power relay member, relative shift of its engaged portion, and its inclining, thereby enabling power to be smoothly transmitted.

According to the present invention, therefore, the power input member of the power transmission device is rotatably supported by the frame and the power relay member is interposed between the power input member and the rotating shaft. Therefore, the shift caused by the manufacturing error of each of parts of the device can be absorbed to transmit only the rotating force to the rotating shaft. In addition, the belts, chains or the like can be tightly stretched and smooth power transmission can thus be attained even when minus torque is applied to them.

BRIEF DESCRIPTION OF THE DRAWING

FIG. 1 shows a centerless machining jackshaft provided with the power transmission device to which the present invention is to be applied.

FIG. 4 is a perspective view showing the positional relation of main components of the device shown in FIG. 3.

FIG. 5 is a perspective view of another embodiment of the device shown in FIG. 4.

DETAILED DESCRIPTION OF THE PREFERRED EMBODIMENT

Figure 2:
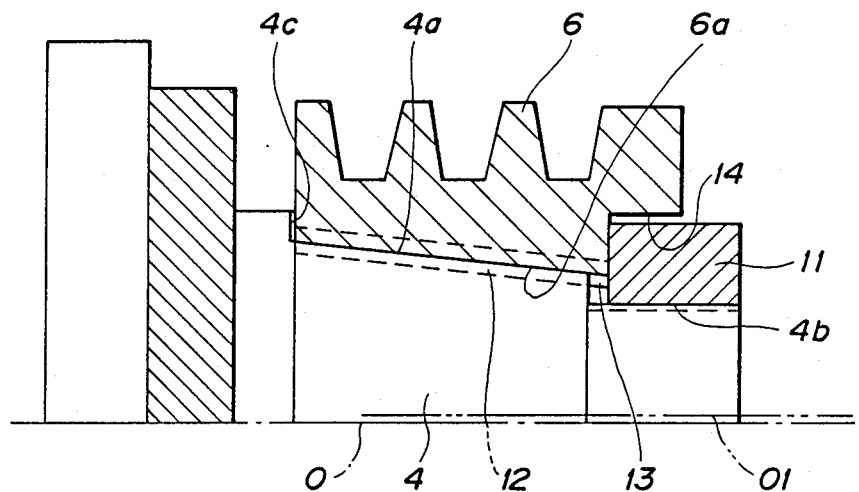
FIG. 2 shows an example of the conventional power transmission device.
Figure 3:
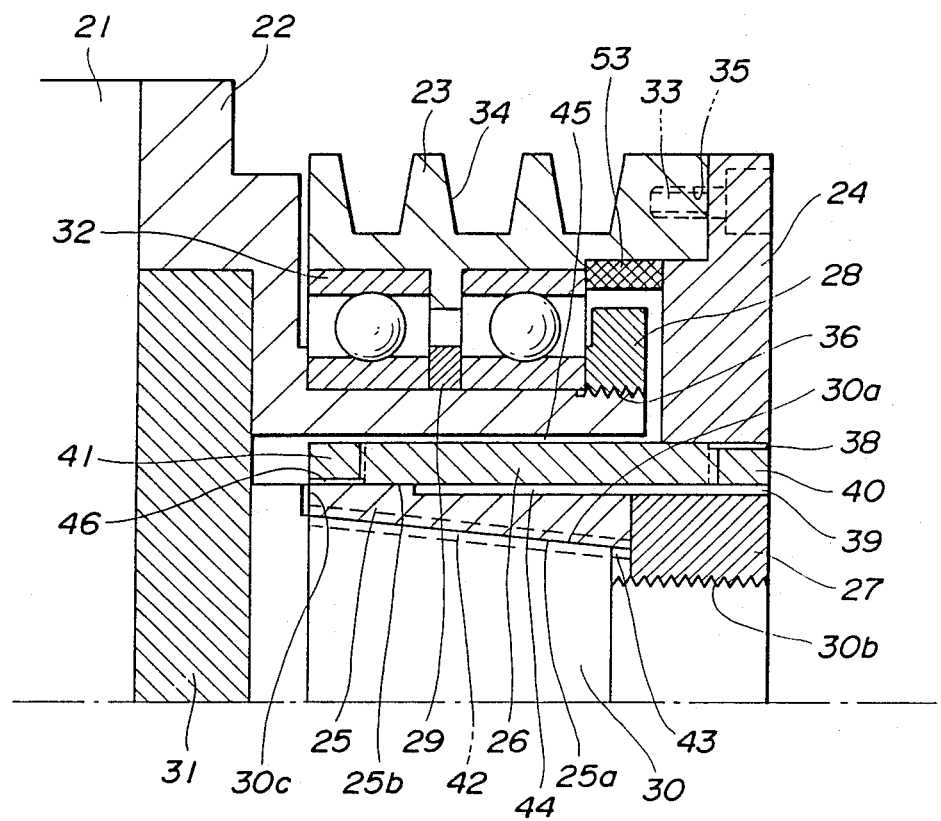
FIG. 3 is a sectional view showing an example of the power transmission device according to the present invention.

FIGS. 3 and 4 show an example of the power transmission device according to the present invention.

The power transmission device is employed by the centerless machining machine or the like and it comprises the main body of a jackshaft or a flange 22 projected from the side or the like of a frame 21, a pulley 23 rotatably supported by the flange 22 through ball bearings 32 to serve as the power input member, a first coupling member 24 fixed to the foremost end of the pulley 23 by means of bolts 33, a power relay member 26 engaged with the first coupling member 24 at the foremost end thereof, a second coupling member 25 engaged with the other end or base portion of the power relay member 26, and a rotating shaft 30 engaged with the second coupling member 25.

The rotating shaft 30 is rotatably supported by the frame 21 and an oil sealing case 31 is attached to the shaft supporting portion of the frame 21. The rotating shaft 30 is tapered, that is, it becomes larger and larger in diameter as it goes from its front end (it is assumed that right in FIG. 3 represents the front end) to its base, and it is provided with a thread portion 30b at its foremost end. It is further enlarged in diameter at the base of its tapered portion 30a to form a shoulder portion 30c extending toward the frame 21.

The pulley 23 is fixedly fitted onto the outer sleeve of the bearings 32 and provided with belt-holding grooves 34 on the outer circumference thereof. The pulley 23 is also provided with plural bolt-screwed holes 35 on the foremost end face thereof with a certain angular distance interposed between the adjacent holes in the circumferential direction thereof. The plural bearings 32 (two bearings in FIG. 3) having an intermediate washer 29 interposed between them are attached to the cylindrical flange 22 projected from the side of the frame 21, and when a bearing pusher 28 which is a nut member is screwed onto the thread portion 36 on the foremost end of the flange 22, the inner sleeve of the bearings 32 is fixed while their outer sleeve is pushed and fixed by the first coupling member 24 through a block ring 53. The pulley 23 is thus rotatably supported on the flange 22.

FIG. 4 is a perspective view showing structures and positional relation of the first coupling member 24, power relay member 26, second coupling member 25, and a fastening nut 27 for attaching and fixing the second coupling member 25 to the rotating shaft 30.

As apparent from FIG. 4, the first coupling member 24 is a disc provided with a through-hole 36 in the center thereof. It is also provided with plural through-holes 37 at its side adjacent to its circumferential rim with a certain angular distance interposed between the adjacent through-holes 37 to correspond to the screw holes 35. It is further provided with plural teeth 38 erected toward a center axis 0 on its inner circumference with a certain angular distance interposed between the adjacent teeth 38 in its circumferential direction.

The power relay member 26 is a cylinder having a hollow portion 39 opened at both ends thereof and such an outer diameter as enables the power relay member 26 to be fitted in the throughhole 36 of the first coupling member 24 and also housed in the hollow portion of the flange 22 with a sufficient clearance 45 interposed between them. The power relay member 26 is provided with first plural teeth 40 erected from its one end face in the longitudinal direction thereof with a certain angular distance interposed between the adjacent teeth 40 to engage with the teeth 38. Recesses 52 are formed between the adjacent teeth 40. Further, the power relay member 26 is also provided with second plural teeth 41 similar to those 40 erected from the other base end face in the longitudinal direction thereof with a certain angular distance interposed between the adjacent teeth 41, and recesses are also formed between the adjacent teeth 41.

The second coupling member 25 is a cylinder opened at both ends thereof and having such an outer diameter as enables the second coupling member 25 to be housed in the hollow portion 39 of the power relay member 26 with a sufficient clearance left between them. The second coupling member 25 has a tapered opening 25a fitting to the tapered portion 30a of the rotating shaft 30. The second coupling member 25 is also provided with a connecting portion 25b, made larger in diameter like a step, at the base end portion thereof and plural teeth 46 are erected radially and outward from the outer circumference of the connecting portion 25b, having a certain angular distance between their adjacent ones in the circumferential direction of the connecting portion 25b. They are engaged with the second teeth 41 of the power relay member 26. Further, key grooves 42 are formed, extending in the longitudinal direction and corresponding to each other, on the outer circumference of the tapered portion 30a of the rotating shaft 30 and also on the inner circumference of the tapered opening 25a of the second coupling member 25. Setting of the second coupling member 25 onto the rotating shaft 30 is carried out in such a way that the second coupling member 25 is fitted onto the rotating shaft 30 from the foremost end side of the rotating shaft 30 to the base side thereof, that a key 43 is put into the key grooves 42, and that the fastening nut 27 is then screwed onto the thread portion 30b of the rotating shaft 30. When the tapered portions 25a and 30a are fitted like this, the second coupling member 25 is fastened and fixed integral to the rotating shaft 30.

When the first coupling member 24, power relay member 26 and second coupling member 25 are then assembled with one another, the power relay member 26 is supported by and engaged with the connecting portion 25b of the second coupling member 25 at the base end portion thereof while also engaged with the first coupling member 24 at the foremost end thereof. Numeral 44 in FIG. 3 represents the above-mentioned clearance provided between the power relay member 26 and the second coupling member 25.

When the power relay member 26, first and second coupling members 24 and 25 are assembled with one another, sufficient clearance is left in the axial direction between a bottom 52a of each of the recesses 52 each formed between the first adjacent teeth 40 of the power relay member 26 and a back end face 38b of each of the inner teeth 38 of the first coupling member 26. Similarly, sufficient clearance is also left between a bottom 47a of each of the recesses 47 each formed between the second adjacent teeth 41 of the power relay member 26 and a front end face 46b of each of the outer teeth 46 of the second coupling member 25. In order to reduce shock caused when the bottoms 52a and the back end faces 38b or the bottoms 47a and the front end faces 46b are struck against one another, it is preferable to stick or coat a resilient material such as rubber 53 or 54 on at least one of the paired faces 52a and 38b, and such as rubber 55 or 56 on at least one of the paired faces 47a and 46b as shown in FIG. 5. Or cavities 50 may be formed on the bottoms 52a of the recesses 52 on the foremost end side of the power relay member 26 (the cavities 50 may be provided at all of the recesses 52 or alternately, for example, in the circumferential direction with a certain angular distance interposed between the adjacent ones) and a spring 51 may be housed in each of the cavities 50, projecting its head from the cavity 50, to strike against the back end face 38b of its corresponding inner tooth 38 of the first coupling member 24, as shown in FIG. 4. Or cavities 48 may be formed on the bottoms 47a of the recesses 47 on the base side of the power relay member 26, having a certain angular distance between the adjacent ones in the circumferential direction of the power relay member 26, and a spring 49 may be housed in each of the cavities 48, projecting its head from the cavity 48, to strike against the front end face 46b of its corresponding outer tooth 46 of the second coupling member 25.

When assembly is done like this, the pulley 23 is connected to the rotating shaft 30 and when the V-belts 7 are then stretched between the pulley 23 and the pulley 5 arranged on the side of the driving motor 1, the system of transmitting power to the rotating shaft 3 is completed.

In the case where power is transmitted from the driving motor 1 through the power transmission device which has the above-described arrangement, the pulley 23 is supported by the flange 22 and the frame 21 even when forces except rotation force or upward and downward forces caused by the eccentricity, for example, are applied to the pulley 23. The rotation force is transmitted from the pulley 23 to the foremost end of the power relay member 26 through the first coupling member 24 and further to the second coupling member 25 which is engaged with the base of the power relay member 26, thereby rotating both of the members 25 and 26. The rotation force is thus transmitted to the rotating shaft 30. Since the power relay member 26 is connected to the second coupling member 25 at the base portion thereof but left untouched with the second coupling member 25 (and the rotating shaft 30) at the remaining area thereof, it transmits power from the pulley 23 to the rotating shaft 30, subjecting to torsional force. Even when shift caused by the eccentricity and the like in the radial or other direction is to be transmitted from the rotating shaft 30 to the pulley or from the pulley to the rotating shaft 30 in the course of operation, the shift is absorbed by the flexibility and inclining capacity of the power relay member 26 and relative shift at the connecting portion thereof to attain smooth power transmission.

When damping material such as rubber is arranged on the contacted faces between the inner teeth 38 and the first teeth 40 or between the outer teeth 46 and the second teeth 41 at the connecting portion between the power relay member 26 and the first coupling member 24 or between the power relay member 26 and the second coupling member 25, noise caused by their engagement can be reduced to attain a quiet operation.

As shown in FIG. 4, cavities similar to those 48 and 50 may be formed in the contacted faces 38a or 46a of the inner or outer teeth 38 or 46 to house springs similar to those 49 and 51.

The power transmission device of the present invention may be made by steel or light material such as plastics.

The power relay member 26 may be provided with plural slim slits extending along the barrel portion thereof. If so, the power relay member 26 will become more flexible in the torsional direction thereof and even when sudden power transmission is done from the driving side (or pulley 23) to the driven side (or rotating shaft the power relay member 26 can soften the shock to prevent the members from being broken.

Although the power transmission from the pulley to the power relay member 26 has been attained by the common gear system, it may be done by the worms and worm gear system.

Although the invention has been described in conjunction with the preferred and exemplary embodiments, it should be understood that many and various modifications in details will readily occur to those skilled in the art without departing from the spirit and scope of the invention set forth in claims.

I claim:

1. A power transmission device comprising
    a frame;
    a driven rotating body rotatably supported by said frame;
    a rotating shaft extending along the rotating center axis of said driven rotating body;
    a power input member for receiving the drive force transmitted from a driving source to said driven rotating body;
    a flange having a hollow cylindrical portion projected from a side of said frame along said rotating shaft;
    said cylindrical portion surrounding said rotating shaft and rotatably supporting said power input member on the periphery of said cylindrical portion;
    a cylindrical power relay member arranged between said power input member and said rotating shaft in a manner that said rotating shaft is accommodated in said power relay member and said power relay member is disposed along said cylindrical portion of said flange;
    said power relay member swingably engaged with said power input member at one end in the longitudinal direction thereof by meshing of plural inner teeth operative with said power input member and first plural teeth of said power relay member, and engaged with said rotating shaft at the other end of said power relay member in the longitudinal direction thereof by meshing of second plural teeth of said power relay member and outer teeth operative with said rotating member.

2. A power transmission device according to claim 1 wherein the foremost end portion of said rotating shaft extends into the inside of said cylindrical power relay member.

3. A power transmission device according to claim 1 wherein a first coupling member is attached to the power input member and provided with a through-hole in the center thereof, wherein plural inner teeth are provided on the inner circumference of said through-hole and first plural teeth are projected, extending in the longitudinal direction, from one end face of said power relay member, and wherein when the inner teeth of said coupling member are engaged with those of said power relay member, power transmission can be attained from the power input member to the power relay member.

4. A power transmission device according to claim 3 wherein second plural teeth are projected, extending in the longitudinal direction, from the other end face of said power relay member and plural outer teeth are provided on the outer circumference of a part which is positioned on the side of the rotating shaft to correspond to the other end face of said power relay member, and wherein when the second projected teeth are engaged with the outer teeth, power transmission can be attained from the power relay member to the rotating shaft.

5. A power transmission device according to claim 4 wherein a second coupling member attached integral to the rotating shaft and having the outer teeth is arranged between the power relay member and the rotating shaft.

6. A power transmission device according to claim 4 wherein cavities are formed in at least either of the bottoms each formed between the second adjacent teeth on the other end face of said power relay member and the front end faces of the outer teeth of said second coupling member and the head of a spring is housed in each of said cavities, with its base contacting either of the bottom and the front end face.

7. A power transmission device according to claim 4 wherein resilient members are attached to at least either of bottoms each formed between the second adjacent teeth on the other end face of said power relay member and front end faces of the outer teeth arranged on the side of said rotating shaft.

8. A power transmission device according to claim 7 wherein said resilient member is a piece of rubber.

9. A power transmission device according to claim 3 wherein resilient members are attached to at least either of bottoms each formed between the first adjacent teeth on the one end face of said power relay member and back end faces of the inner teeth of said first coupling member.

10. A power transmission device according to claim 9 wherein said resilient member is a piece of rubber.

11. A power transmission device according to claim 3 wherein cavities are formed in at least either of the bottoms each formed between the first adjacent teeth on the one end face of said power relay member and the back end faces of the inner teeth of said first coupling member and the head of a spring is housed in each of said cavities, with its base contacting either of the bottom and the back end face.

* * * * *